United States Patent [19]

Klein

[11] Patent Number: 5,287,262
[45] Date of Patent: Feb. 15, 1994

[54] HIGH VOLTAGE RESONANT INVERTER FOR CAPACITIVE LOAD

[75] Inventor: Jurgen Klein, Aachen, Fed. Rep. of Germany

[73] Assignee: Heraeus Lasersonics, Inc., Milpitas, Calif.

[21] Appl. No.: 867,737

[22] Filed: Apr. 13, 1992

[30] Foreign Application Priority Data

Apr. 13, 1991 [DE] Fed. Rep. of Germany ....... 4112161

[51] Int. Cl.$^5$ ............................................. H02M 7/538
[52] U.S. Cl. ........................................ 363/134; 372/38
[58] Field of Search .................... 363/134; 372/38; H02M 7/538

[56] References Cited

U.S. PATENT DOCUMENTS

| | | | |
|---|---|---|---|
| 4,071,812 | 1/1978 | Walker | 363/80 |
| 4,443,840 | 4/1984 | Geissler et al. | 363/24 |
| 4,706,252 | 11/1987 | Egawa et al. | 372/38 |
| 4,790,980 | 12/1988 | Erni et al. | 422/186.15 |
| 4,811,192 | 3/1989 | Egawa | 363/132 |
| 5,001,621 | 3/1991 | Egawa | 363/132 |
| 5,008,894 | 4/1991 | Laakmann | 372/38 |

FOREIGN PATENT DOCUMENTS

| | | |
|---|---|---|
| 3142304A1 | 5/1983 | Fed. Rep. of Germany . |
| 3401287A1 | 7/1985 | Fed. Rep. of Germany . |
| 3639075A1 | 5/1988 | Fed. Rep. of Germany . |

*Primary Examiner*—William H. Beha, Jr.
*Attorney, Agent, or Firm*—Finnegan, Henderson, Farabow, Garrett, & Dunner

[57] ABSTRACT

An inductor is connected in parallel with an electrical load which, together with the capacitive components of the load, forms a resonant circuit. An auxiliary inductance coupled to the aforesaid conductor is energized periodically. During the oscillations, the resonant circuit delivers the energy to the load. The power dissipation of the switches is very low, due to the auxiliary inductance and the resonant circuit. The high-voltage generator is particularly suitable for gas lasers.

5 Claims, 3 Drawing Sheets

HIGH VOLTAGE RESONANT INVERTER FOR CAPACITIVE LOAD

BACKGROUND OF THE INVENTION

This invention relates to a high-voltage generator for electrical loads containing capacitive components, particularly for lasers.

To excite a gas discharge in electrically pumped gas lasers with dielectric input coupling, a high-frequency alternating voltage having peak values of several kV to some 10 kV is needed. Usually, tube transmitters having an approximately sinusoidal output signal at a frequency of some 10 MHz are used for this purpose.

Generators using semiconductor switches and based on the operation of switched-mode power supplies currently used in power supply systems are less expensive to produce and also to operate because of their higher efficiency. In this arrangement the alternating voltage taken from the power line is rectified, filtered and then chopped by means of semiconductor switches, at a frequency of some 10 kHz up to a few MHz. The voltage produced, having an almost rectangular variation with time, is then transformed up to the required value with the aid of suitably designed transformers and applied to the electrodes for the gas discharge. The disadvantage of this arrangement is that the electrical load applied to the generator may contain only small capacitive components in parallel with its output since, when a rectangular voltage signal is applied to a capacitor, unavoidable power dissipation arises in the internal impedance of the voltage gas discharge arrangement.

An object of the present invention therefore is to provide a high-voltage generator in such a manner that the power dissipation can be reduced even in arrangements of simple design and having higher capacitive components.

SUMMARY OF THE INVENTION

This object is achieved in accordance with the present invention by providing a high-voltage generator for an electrical load having capacitive components comprising a main inductor connected across and in parallel with the electrical load, said main inductor and the load consisting of a resonant circuit, an auxiliary inductor inductively coupled to the main inductor, and drive circuit means including means for connecting the auxiliary inductor across on alternating current source to energize periodically the electrical load.

In the high-voltage generator according to the invention, the low-loss inductor is connected in parallel with the electrical load, which inductor, together with the capacitive components of this load, forms a resonant circuit with a high quality factor. Energy is coupled into this resonant circuit at suitable times via the auxiliary inductor and is delivered during the subsequent oscillations. This high-voltage generator is preferably suitable for gas lasers. During the oscillations, the resonant circuit delivers the energy to the gas discharge of the laser. The auxiliary inductor and the resonant circuit have the result that the power dissipation of the switches is very low.

BRIEF DESCRIPTION OF THE DRAWINGS

Further features of the invention will be seen from the specification and drawings which describe in greater detail a embodiment of the invention. In the drawings.

DETAILED DESCRIPTION OF THE INVENTION

Figure 1:
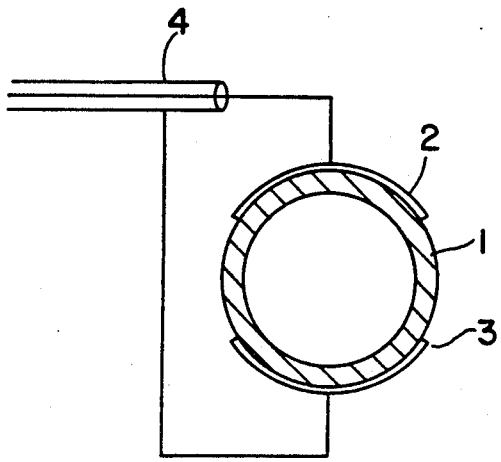
FIG. 1 is diagrammatic view in cross-section of a dielectrically excited gas laser of the prior art.

The dielectrically excited gas laser shown in FIG. 1 has a discharge tube 1 in which the lasing medium is located. On the outside of the discharge tube 1, two electrodes 2 and 3 are provided diametrically opposite to one another and are connected via a feed line 4 to an alternating current source (not shown).

Figure 2:
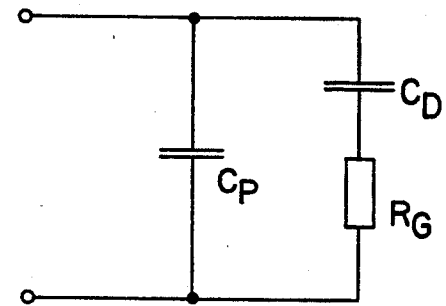
FIG. 2 shows an equivalent circuit for the laser according to FIG. 1.

FIG. 2 shows the simplified equivalent circuit of the dielectrically excited gas laser according to FIG. 1. The capacitance $C_D$ of the dielectric is connected in series with the approximately real resistance $R_G$ of the gas discharge. The dielectric is determined by the gas discharge vessel 1 and the gaseous lasing medium located in it. In parallel with the capacitance $C_D$ and with the resistance $R_G$, a parasitic capacitance $C_p$ is provided which is composed of several components. Significant contributions are provided, for example, by the winding capacitance of the secondary coil of a high-voltage transformer. In most cases the coaxial connecting line between the generator and the gas discharge vessel 1 and the capacitance formed by the walls of this discharge vessel 1, have a high dielectric constant. In this known gas laser with a semiconductor-based generator, the walls of the discharge vessel 1 are constructed to be very thin, in order to keep the voltage drop across the dielectric formed by them and the magnitude of the capacitance $C_p$ as low as possible. This is intended to minimize the power dissipation. When a capacitor having the capacitance C is loaded with a rectangular voltage signal of amplitude U and frequency f, the unavoidable power dissipation $$P_v = f \cdot C \cdot U^2$$

is obtained in the internal impedance of the voltage source. The result of this relationship is that the voltage drop and the capacitance C must be kept small in order to achieve a power dissipation $P_v$ which is low. For this reason, high-quality materials requiring cost-intensive machining are used in the known gas laser described. Thus, the discharge vessels, for example, are made of ceramics which must be ground in elaborate and costly processes. In principle, the electrodes 2, 3 can also be mounted on the inside of the discharge vessel 1. In this case, however, they must be covered by a dielectric which also requires elaborate and costly machining steps.

Figure 3:
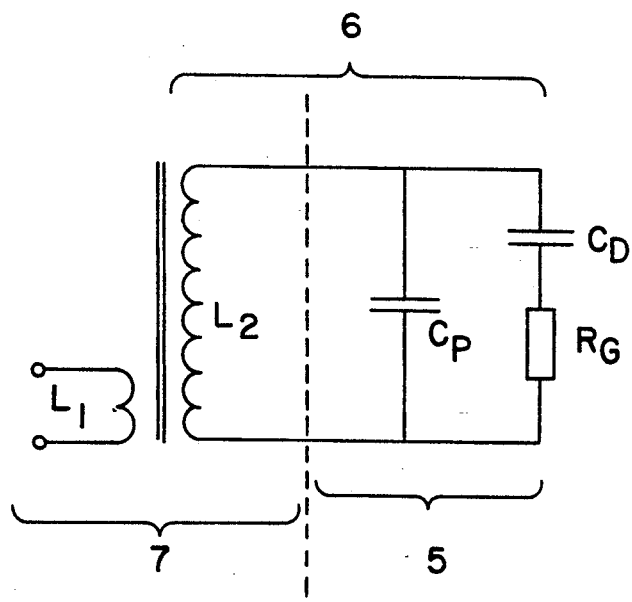
FIG. 3 shows an equivalent circuit for a laser according to the invention.

These disadvantages are avoided in the gas laser of this invention. Here, the generator for the gas laser is constructed in a special manner. Connected in parallel with the load 5 shown diagrammatically in FIG. 3 (i.e., capacitance $C_D$, resistance $R_G$, and parallel capacitance $C_p$), is a low-loss inductor $L_2$ which, together with the capacitive components of the load 5, forms a resonant circuit 6 with a high quality factor. Energy is coupled into this circuit, in each case at suitable times, via an auxiliary coil $L_1$, which is magnetically coupled to the inductor $L_2$, which energy is delivered to the discharge during the subsequent oscillations. Since it is the resistive component which produces the highest losses in this resonant circuit, a correspondingly large proportion of the energy absorbed by the resonant circuit 6 is delivered to the discharge. The coupling of the two inductors $L_1$ and $L_2$, the times and the duration of the coupling-in of the energy are selected in such a manner that the current flow through the auxiliary inductor $L_1$ is controlled with very high efficiency. In this connection, it is pointed out that an inductor can have a core comprised of a material with (a) a permeability in the range of 1 (for example air or plastics); or (b) a permeability which is different (for example a ferrite core). If the inductor is energized by alternating current the current flow will cause, in case (b) above, an additional energy loss (conversion into heat) appropriate to the work which is required to magnetize the material according to the hysteresis curves of the core material. In the present application it is required to provide a magnetic coupling between the auxiliary coil $L_1$ and inductor $L_2$, which is accomplished by the use of a core material preferably having a permeability range of one with a minimized loss and an air gap in the core. The air gap is dependent on the coefficient of coupling between the two coils, whereby a reduction of the losses is achieved by a suitable enlargement of the magnetic cross sectional area of the core in conjunction with a reduction of the magnetic field intensity which is relevant to the losses.

The current flow through the switching elements can be almost zero during their closing and opening processes but assumes high values with, at the same time, almost disappearing voltage in the meantime. The power dissipation of these switches is therefore less than when rectangular voltage pulses are generated across the primary winding of conventional switched-mode power supplies, in which both high voltages and currents occur at and in the switches during the switching edges. In addition, the requirements for the switching speeds of the switching elements are lower so that, for example, inexpensive semiconductors can be used.

Figure 4:
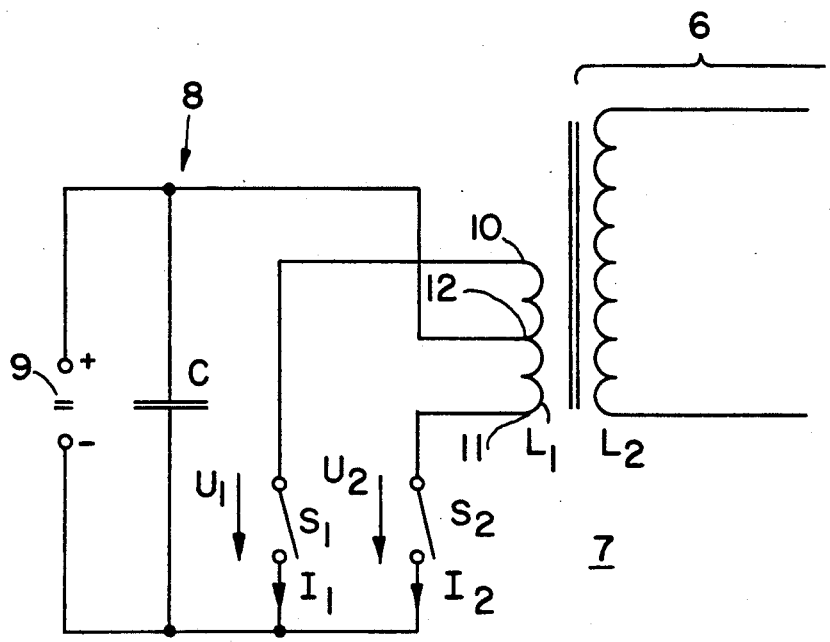
FIG. 4 shows an embodiment of a drive circuit for the laser according to FIG. 3.

FIG. 4 shows diagrammatically a drive circuit for the gas laser. An alternating-current source having a frequency in the range of between 100 kHz and two MHz is used as the current source 9. A capacitor C and two switches $S_1$ and $S_2$ are connected in parallel with the current source. These switches are closed and opened in push-pull.

The switch $S_1$ is connected to one end 10 of the winding of the auxiliary coil $L_1$ and the switch $S_2$ is connected to the other end 11 of the winding. Further the positive terminal of the current source 9 is connected to the center tap 12 of the auxiliary coil $L_1$.

The tightness of the magnetic coupling between the two inductors or coils $L_1$ and $L_2$ is a decisive optimization parameter for obtaining a very low power dissipation. If most of the flux from one coil links the other coil, the coefficient of coupling is near one; we say the coils are "tightly coupled". If the coils are far apart or arranged in such a manner that there is no flux linkage, the coefficient of coupling is zero and no coupling-in of energy will be initiated in the resonant circuit; this coupling mode is designated as "loose". If the coupling is too loose, the current through the inductor $L_1$ and the switching elements, required for the energy transmission in the inductor $L_2$, assumes very high values. After the maximum value has been reached, the current no longer drops to small values.

If the coupling is too tight, the steep switching edges required at the inductance $L_1$ for low-loss switching of the switching elements are transmitted to the resonant circuit 6 and, as a result, generate losses in the internal impedance of the generator 7 in accordance with the relationship specified above.

The switching losses on the switching elements can be reduced further if energy is coupled into the resonant circuit 6 not with each period of oscillation but only with, for example, each second or third period of oscillation, and is also introduced into the discharge during the remaining periods. The consideration is to reduce the frequency of the driving circuit of the oscillation: if an oscillation is established it might be maintained by drive pulses at a "subharmonic." The pulse period is not changed significantly from the normal drive; however, the repetition rate is reduced basically by blanking out pulses. For a known oscillation frequency this can be accomplished by incorporating a separate oscillator made to operate at, for instance, $\frac{1}{2}$ or $\frac{1}{3}$ of the original frequency and a pulse-shaping circuit to time the pulse driver. The switches $S_1$ and $S_2$ remain open during this time so that the auxiliary inductor $L_1$ remains almost without influence on the resonant circuit 6. During the switch-on times, the switches $S_1$ and $S_2$ must switch higher peak currents than in the operating mode shown in FIG. 3 to generate the same high-frequency power.

Figure 6:
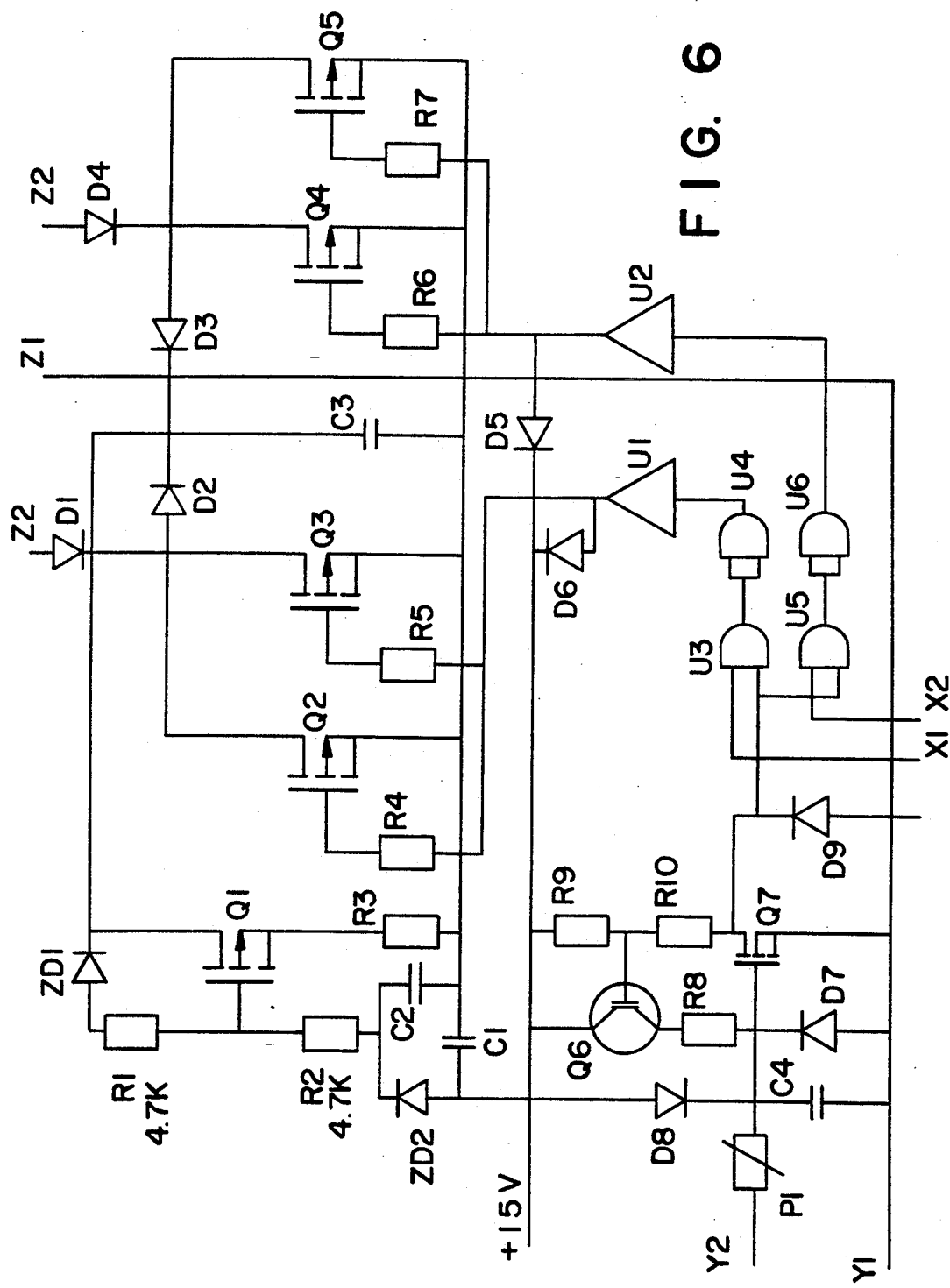
FIG. 6 is a detailed circuit diagram of a switching circuit in accordance with the present invention.

The switching elements are advantageously formed by semiconductors which are inexpensively available and present no problems in operation. Referring to the circuit diagram of FIG. 6, logic gates U3 through U6 provide the timing of the switching commands from the inputs X1 and X2. The components U1, U2 integrated circuits of type LD 4420 provide the power to drive the main switching power MOS FET transistors Q2 through Q5 via 6.8 Ohm resistors R4 through R7. This comprises the direct drive path. Components Q1 and associated diodes, resistor, and capacitors (D2, D3, ZD1, ZD2, R1, R2, R3, C1, C3) are to prevent overvoltage to occur on the main switching transistors Q2 through Q5 and are commonly referred to as snappers. Small signal components Q6 and Q7 and their associated circuit (D7, D8, P1, C4, R8, R9, R10) are concerned with overall shut down options and do not alter the actual timing at the oscillating frequency.

Figure 5:
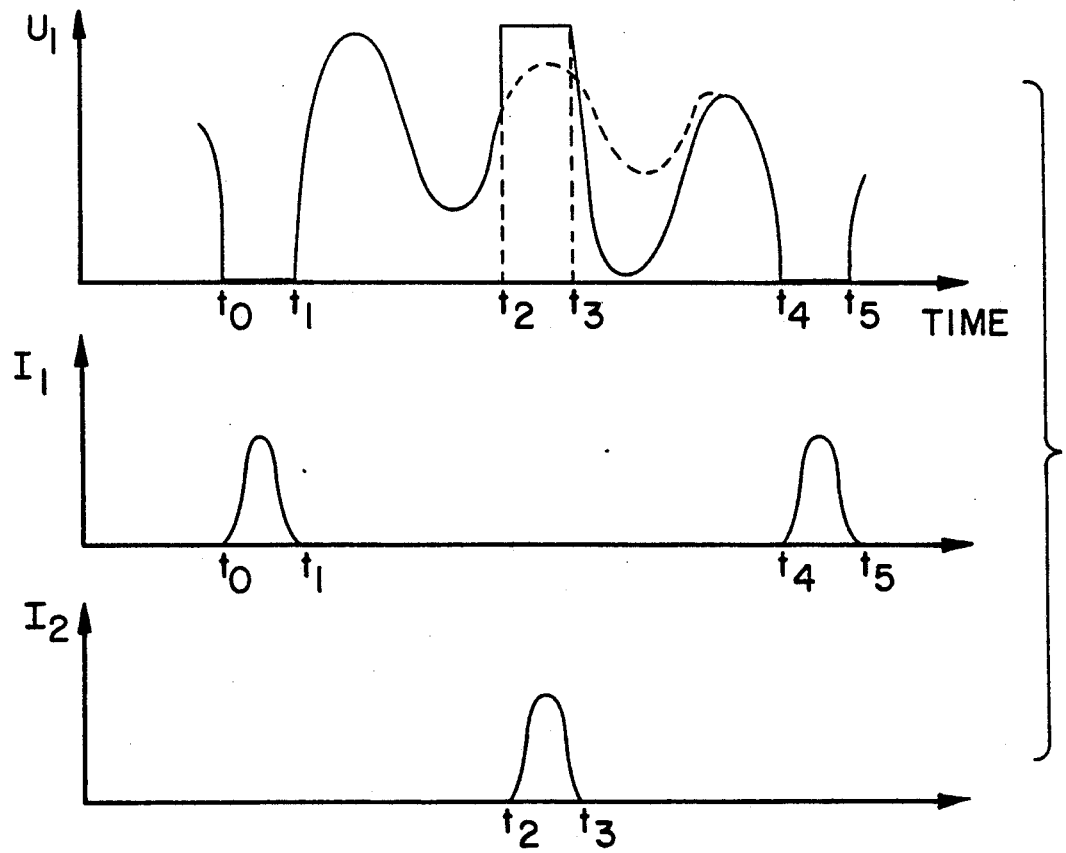
FIG. 5 shows diagrammatically the relationship between voltage and current and the time at switching of the elements of the drive circuit according to FIG. 4.

FIG. 5 shows the voltage and current variation on the two switches $S_1$ and $S_2$. In the top diagram of FIG. 5, the voltage $U_1$ is plotted against time, while in the two bottom diagrams the currents $I_1$ and $I_2$, occurring at switches $S_1$ and $S_2$ are plotted against time. $U_1$ corresponds to a doubled voltage of the direct current (rectified voltage of the power supply); $I_1$: 20...50 A (peak value); $t_1 = t_0 = t_3 - t_2$: about 2 ,us (micro-seconds); and $t_2 - t_1 = t_4 - t_3$: about 5 ,us (5 micro-seconds). The inductivity comprises a circuit of two coils in series, six primary windings and 100 secondary windings with cores of ferrite material; area of cross section: 30×30 mm; material N27 comprising an (initial-) permeability of 2000, air gap about 0.5 mm; the electrical load consists in a diffusion-cooled $CO_2$ laser with capacitive components having a power output of about 100 W. The switching times as indicated above are dependent on the coefficient of coupling and on the structure of discharge.

When the switch $S_1$ is closed at time $t_0$, the current $I_1$ rises from the value 0 to a maximum and drops to zero at time $t_1$, when switch $S_1$ is opened again. During the time in which the switch $S_1$ is closed, that is to say in time $t_0$ to $t_1$, the voltage $U_1$ is virtually zero. After about one period of oscillation, the switch $S_2$ in the push-pull circuit 8 is closed at time $t_2$. The voltage $U_1$ then increases and remains constant during the closed phase of the switch $S_2$. At the closing time $t_2$, the current $I_2$ at the switch $S_2$ again rises to a maximum and drops until it has almost dropped to zero at time $t_3$, when the switch $S_2$ is opened again.

After the opening of the switch $S_2$, the switch $S_1$ is closed again only after one period of oscillation, at time $t_4$, and is opened again at time $t_5$. During the closed time, the current $I_1$ again rises to a maximum and is almost zero both at time $t_4$ and at time $t_5$.

After the generator has been switched on, the discharge not having been ignited yet, the resonant circuit 6 described is initially damped only slightly so that the voltage present across the discharge path is greatly increased compared with the operation when the discharge is ignited. This ensures reliable ignition of the laser gas mixture.

Including the load or, respectively, discharge structure 5 in the circuit for generating the alternating voltage results in a resonant circuit 6 of initially high quality factor which is significantly damped only by the energy delivered to the gas discharge after the ignition of the gas discharge. Energy is then inserted periodically into this resonant circuit 6, in the manner described, by means of the auxiliary coil $L_1$ which is coupled in by suitable magnetic means and is preferably DC-isolated. The auxiliary coil $L_1$ is used for controlling current via the switches $S_1$ and $S_2$, the switching-on and switching-off times being selected in such a manner that only a low current in comparison with the peak value (compare FIG. 5) needs to be switched during the switching process. The power dissipation of the switches $S_1$ and $S_2$ is therefore low. In addition, the requirements for the switching speeds of these switching elements $S_1$ and $S_2$ are only low, as a result of which it becomes possible to use inexpensive semiconductors as switches. To optimize the switching times of the switches $S_1$ and $S_2$, an automatic matching device can be provided. For example, the high voltage driver circuit together with the load of a lasing multielectrode laser-tube has a given resonance frequency. By tailoring the driver circuits' own oscillator frequency, the phase at the switching times can be varied. Conversely, a suitable detection circuit can be utilized to dynamically set the oscillator frequency such that a desired phase for the switching time is obtained.

The generators described can also be used, for example, in process technology, for example at locations where large-area discharges with high input power are used for coating or modifying surfaces.

I claim:

1. A high voltage generator for an electrical load having capacitive components, comprising:
    a main inductor connector across and in parallel with the electrical load, said main inductor and the load constituting a resonant circuit;
    an auxiliary inductor magnetically coupled to the main inductor;
    a drive circuit including the auxiliary inductor and a pair of parallel connected switches connected across an alternating current source having a peak current to energize periodically the electrical load; and
    means for opening and closing the pair of parallel switches alternately in push pull relationship at times to apply to the auxiliary inductor a current below the peak current of the current source.

2. The generator of claim 1, wherein the means for opening and closing the pair of switches includes means for switching at times to apply to the auxiliary inductor during switching a current smaller than the peak current by at least one-half.

3. The generator of claim 1, wherein the means for opening and closing the pair of switches include means for switching at times to provide a current flowing through each of the pair of switches of approximately zero value at switch-off time.

4. The generator of claim 1, wherein the switches comprise semiconductor elements.

5. The generator of claim 1, further comprising an automatic matching device for matching the resonant frequency to the load to optimize the switching times of the pair of switches.

* * * * *